US010660137B2

(12) United States Patent
Lin et al.

(10) Patent No.: US 10,660,137 B2
(45) Date of Patent: May 19, 2020

(54) RANDOM ACCESS CHANNEL CONTENTION RESOLUTION

(71) Applicants: Yicheng Lin, Ottawa (CA); Mohammadhadi Baligh, Ottawa (CA)

(72) Inventors: Yicheng Lin, Ottawa (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 171 days.

(21) Appl. No.: 15/885,218

(22) Filed: Jan. 31, 2018

(65) Prior Publication Data

US 2018/0220468 A1 Aug. 2, 2018

Related U.S. Application Data

(60) Provisional application No. 62/453,782, filed on Feb. 2, 2017.

(51) Int. Cl.
  *H04W 74/08* (2009.01)
  *H04W 74/00* (2009.01)
  (Continued)

(52) U.S. Cl.
  CPC ....... *H04W 74/0841* (2013.01); *H04W 48/16* (2013.01); *H04W 74/008* (2013.01); *H04W 28/26* (2013.01)

(58) Field of Classification Search
  None
  See application file for complete search history.

(56) References Cited

U.S. PATENT DOCUMENTS

| 8,493,917 B2 * | 7/2013 | Meyer | H04W 74/006 370/328 |
| 2011/0244907 A1 * | 10/2011 | Golaup | H04W 4/70 455/509 |

(Continued)

FOREIGN PATENT DOCUMENTS

| CN | 101588637 A | 11/2009 | |
| WO | WO 2012/116709 | * 3/2011 | H04W 36/00 |

(Continued)

OTHER PUBLICATIONS

3GPP TS 36.321 V13.4.0 (Dec. 2016); 3rd Generation Partnership Project; Technical Specification Group Radio Access Network; Evolved Universal Terrestrial Radio Access (E-UTRA); Medium Access Control (MAC) protocol specification (Release 13) (Year: 2016).*

*Primary Examiner* — Joseph A Bednash

(57) ABSTRACT

Colliding random access channel messages from multiple User Equipment (UEs) attempting to access a communication system include common access information for the multiple UEs. Responses to the messages are transmitted. A response to one UE includes UE identifier information from the common access information and responses to other UEs include new UE identifier information for each other UE. In another embodiment, a random access channel message that is received from a UE includes a dedicated random access sequence that is dedicated for use by a particular UE within a coverage area of a communication system. A determination can be made as to whether the received random access channel is received from the particular UE based on any one or more of: a set of one or more access points at which, a direction from which, and a receiving antenna beam on which the received random access channel message is received.

26 Claims, 9 Drawing Sheets

(51) Int. Cl.
*H04W 28/26* (2009.01)
*H04W 48/16* (2009.01)

(56) References Cited

U.S. PATENT DOCUMENTS

2013/0258961 A1* 10/2013 Ye .................. H04W 74/04
370/329
2017/0231011 A1* 8/2017 Park ................ H04W 72/0446
2018/0035466 A1* 2/2018 Rune ............... H04W 74/08

FOREIGN PATENT DOCUMENTS

| WO | 2015119555 A1 | 8/2015 |
| WO | 2016140605 A1 | 9/2016 |
| WO | 2016164011 A1 | 10/2016 |

* cited by examiner

RANDOM ACCESS CHANNEL CONTENTION RESOLUTION

CROSS-REFERENCE TO RELATED APPLICATIONS

The present application claims the benefit of U.S. Provisional Application No. 62/453,782, filed on Feb. 2, 2017, entitled "RANDOM ACCESS CHANNEL CONTENTION RESOLUTION", the entire contents of which are incorporated herein by reference.

FIELD

The present disclosure relates generally to wireless communications and, in particular, to contention resolution for random access channels.

BACKGROUND

Some types of wireless communication systems support random access channels. In current Long Term Evolution (LTE) systems, for instance, a User Equipment (UE) selects a preamble and a random access channel (RACH) resource in which to transmit the preamble to network equipment, to initialize an access procedure. Collision occurs when multiple UEs select the same preamble and transmit on the same RACH resource. Contention resolution in the event of such collision typically involves restarting the access procedure for at least all but one of the UEs, and possibly all of the UEs.

SUMMARY

According to one aspect of the present disclosure, a method involves: receiving colliding random access channel messages from multiple UEs attempting to access a communication system, the received random access channel messages including common access information for the multiple UEs; and transmitting responses to the received random access channel messages, the responses including a response to one of the UEs that includes UE identifier information from the common access information and responses to other UEs that include new UE identifier information for each other UE.

Optionally, in some embodiments a method also involves distinguishing between the received random access channel messages based on different characteristics of the received random access channel messages other than the common access information.

Optionally, in some embodiments the different characteristics are different sets of one or more access points at which the received random access channel messages are received.

Optionally, in some embodiments the different characteristics are different directions from which the received random access channel messages are received.

Optionally, in some embodiments the different directions are determined based on receiving antenna beams on which the received random access channel messages are received.

Optionally, in some embodiments the different characteristics are different payloads attached to the common access information in the received random access channel messages.

Optionally, in some embodiments the response transmitted to each UE carries the different payload attached to the common access information in the random access channel message received from the UE.

Optionally, in some embodiments the common access information includes a predetermined sequence selected by each of the UEs.

Optionally, in some embodiments a method involves transmitting the responses to the received random access channel messages based on the different characteristics.

Optionally, in some embodiments the UE identifier information includes a temporary identifier assigned in response to previous colliding random access channel messages, and the new UE identifier information includes an identifier that is different from the temporary identifier.

Optionally, in some embodiments the random access channel message received from each UE further includes contention resolution identifier information for the UE, and each of the responses to the other UEs includes the UE identifier information and the contention resolution identifier information for the other UE to which the response is transmitted.

According to another aspect of the present disclosure, a method involves: receiving from a UE a random access channel message that includes a dedicated random access sequence dedicated for use by a particular UE within a coverage area of a communication system; and determining whether the received random access channel is received from the particular UE. The determining is based on any one or more of: a set of one or more access points at which the received random access channel message is received, a direction from which the received random access channel message is received, and a receiving antenna beam on which the received random access channel message is received.

According to another aspect of the present disclosure, a non-transitory processor-readable medium stores instructions which, when executed by one or more processors, cause the one or more processors to perform a method disclosed herein.

Another aspect of the present disclosure relates to an apparatus that includes: a receiver; a transmitter; and an access controller, operatively coupled to the receiver and to the transmitter, to receive colliding random access channel messages from multiple UEs attempting to access a communication system. The received random access channel messages include common access information for the multiple UEs, and the access controller is configured to transmit responses to the received random access channel messages, the responses comprising a response to one of the UEs that includes UE identifier information from the common access information and responses to other UEs that include new UE identifier information for each other UE.

Optionally, in some embodiments the access controller is further configured to distinguish between the received random access channel messages based on different characteristics of the received random access channel messages other than the common access information.

Optionally, in some embodiments the different characteristics are different sets of one or more access points at which the received random access channel messages are received.

Optionally, in some embodiments the different characteristics are different directions from which the received random access channel messages are received.

Optionally, in some embodiments the different directions are determined based on receiving antenna beams on which the received random access channel messages are received.

Optionally, in some embodiments the different characteristics are different payloads attached to the common access information in the received random access channel messages.

Optionally, in some embodiments the response transmitted to each UE carries the different payload attached to the common access information in the random access channel message received from the UE.

Optionally, in some embodiments the common access information comprises a predetermined sequence selected by each of the UEs.

Optionally, in some embodiments the access controller is further configured to transmit the responses to the received random access channel messages based on the different characteristics.

Optionally, in some embodiments the UE identifier information includes a temporary identifier assigned in response to previous colliding random access channel messages, and the new UE identifier information includes an identifier that is different from the temporary identifier.

Optionally, in some embodiments

According to a further aspect of the present disclosure, an apparatus includes: a receiver; and an access controller, operatively coupled to the receiver, to receive from a UE a random access channel message that includes a dedicated random access sequence dedicated for use by a particular UE within a coverage area of a communication system. The access controller is also configured to determine whether the received random access channel is received from the particular UE based on one or more of: a set of one or more access points at which the received random access channel message is received, a direction from which the received random access channel message is received, and a receiving antenna beam on which the received random access channel message is received.

Other aspects and features of embodiments of the present disclosure will become apparent to those ordinarily skilled in the art upon review of the following description.

BRIEF DESCRIPTION OF THE DRAWINGS

Embodiments of the invention will be described in greater detail with reference to the accompanying drawings.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Turning now to the figures, some specific example embodiments will be described.

Figure 1:
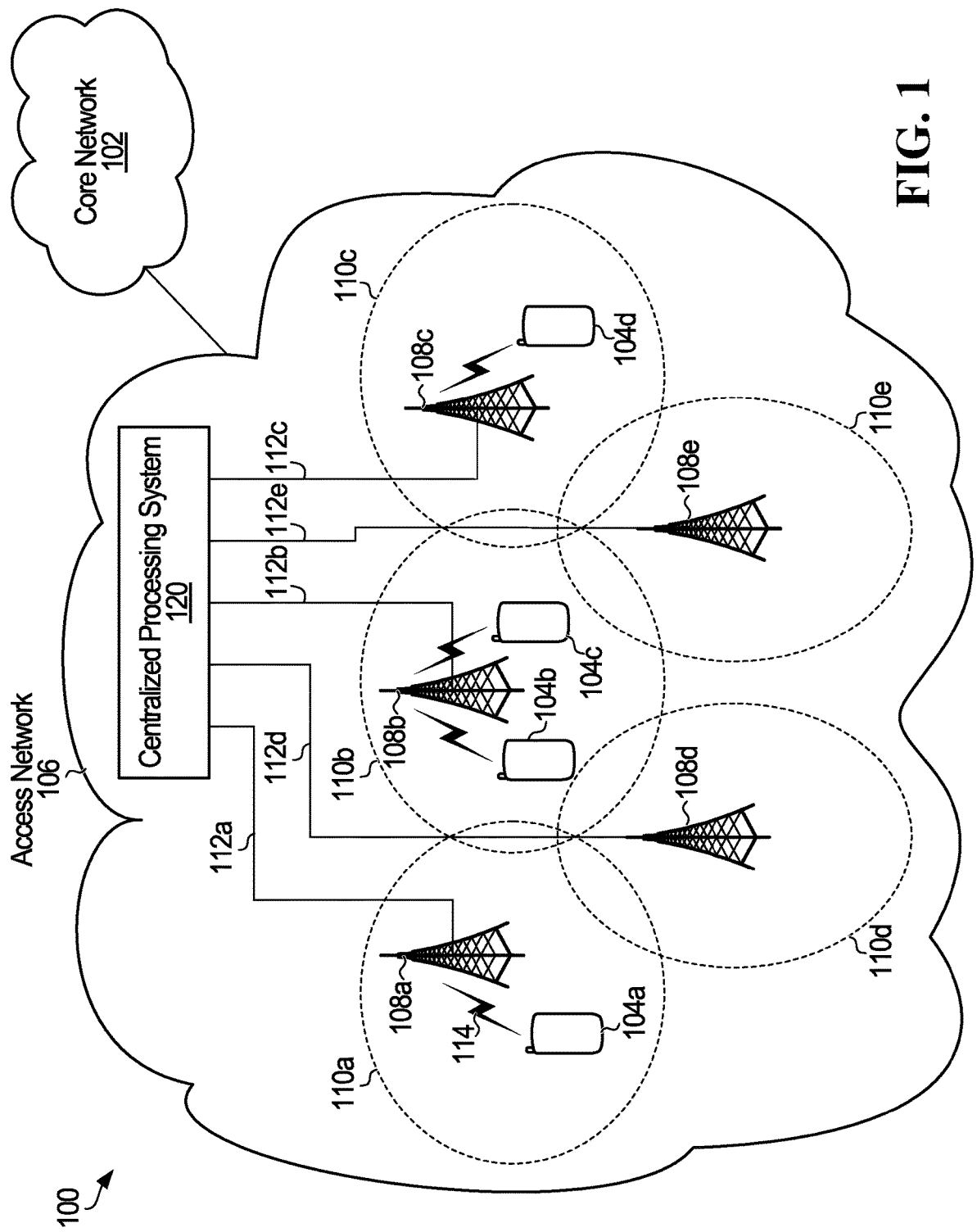
FIG. 1 is a block diagram illustrating a communication system in which embodiments disclosed herein could be implemented.

FIG. 1 is a diagram illustrating a communication system in which embodiments disclosed herein could be implemented. The communication system 100 includes a core network 102 and an access network 106.

The core network 102 may provide any of various services, such as call control/switching and gateways to other networks. Network equipment in the core network 102 could include such equipment as routers, switches, and servers.

The access network 106 is a wireless communication network, and is connected or coupled to the core network 102. The network elements or nodes 108a, 108b, 108c, 108d, 108e provide wireless communication service within respective wireless coverage areas 110a, 110b, 110c, 110d, 110e. Each network element 108a-e may be implemented using a radio transceiver, one or more antennas, and associated processing circuitry, such as antenna radio frequency (RF) circuitry, analog-to-digital/digital-to-analog converters, etc. Base stations, transmit-receive points (TRPs), and evolved NodeBs (eNBs) are examples of the network elements 108a-e.

UEs 104a, 104b, 104c, 104d wirelessly access the communication system 100 using the access network 106. Each UE 104a-d includes a radio transmitter and a radio receiver which may be integrated into a radio transceiver, one or more antennas, and associated processing circuitry, such as antenna radio frequency (RF) circuitry, analog-to-digital/digital-to-analog converters, etc. The network elements 108-e and the UEs 104a-d may include similar types of components to support communications with each other in the communication system 100, but the actual implementations may be different. For example, the UEs 104a-d are portable between locations, whereas the network elements 108a-e are typically intended to remain at fixed locations.

The network elements 108a-e are connected to a centralized processing system 120 in the access network 106, via respective communication links 112a, 112b, 112c, 112d, 112e. Each communication link 112a-e is an optical fibre communication link in one embodiment. Each network element 108a-e includes circuitry for transmitting data to the centralized processing system 120 and for receiving data from the centralized processing system via its respective communication link 112a-e. Although shown as a single centralized processing system in FIG. 1, the centralized processing system 120 may be implemented by a network of one or more processing and control servers. Alternatively, the centralized processing system 120 may be implemented as a single server.

The network elements 108a-e may serve as a gateway between wireline and wireless portions of the access network 106, although this need not be the case in embodiments in which the communication links 112a-e are wireless links. The network elements 108a-e may be placed at fixed locations by a network provider, for example, to provide a substantially continuous wireless coverage area. This is shown in FIG. 1 in that wireless coverage areas 110a-e overlap each other so that the UEs 104a-d may move throughout the wireless coverage areas and still be served by the access network 106.

Under certain conditions, a UE 104a-d could transition from an active operating mode or state to a standby operating mode or state. For example, a UE 104a-d could transition to a standby operating mode after a time period of inactivity, during which limited communication signals were received or transmitted by the UE and the UE was not otherwise in use by a user. The UEs 104a-d could transition to a standby operating mode after a time period of reduced activity, or activity below a threshold level. The standby operating mode allows the UEs to conserve battery power and thereby extend battery life, for example. Although limited communication functions may be supported in the standby operating mode, a UE 104a-d transitions from the standby operating mode to the active operating mode before full communication functions are restored. RRC idle is an example of a standby operating mode.

Figure 2:
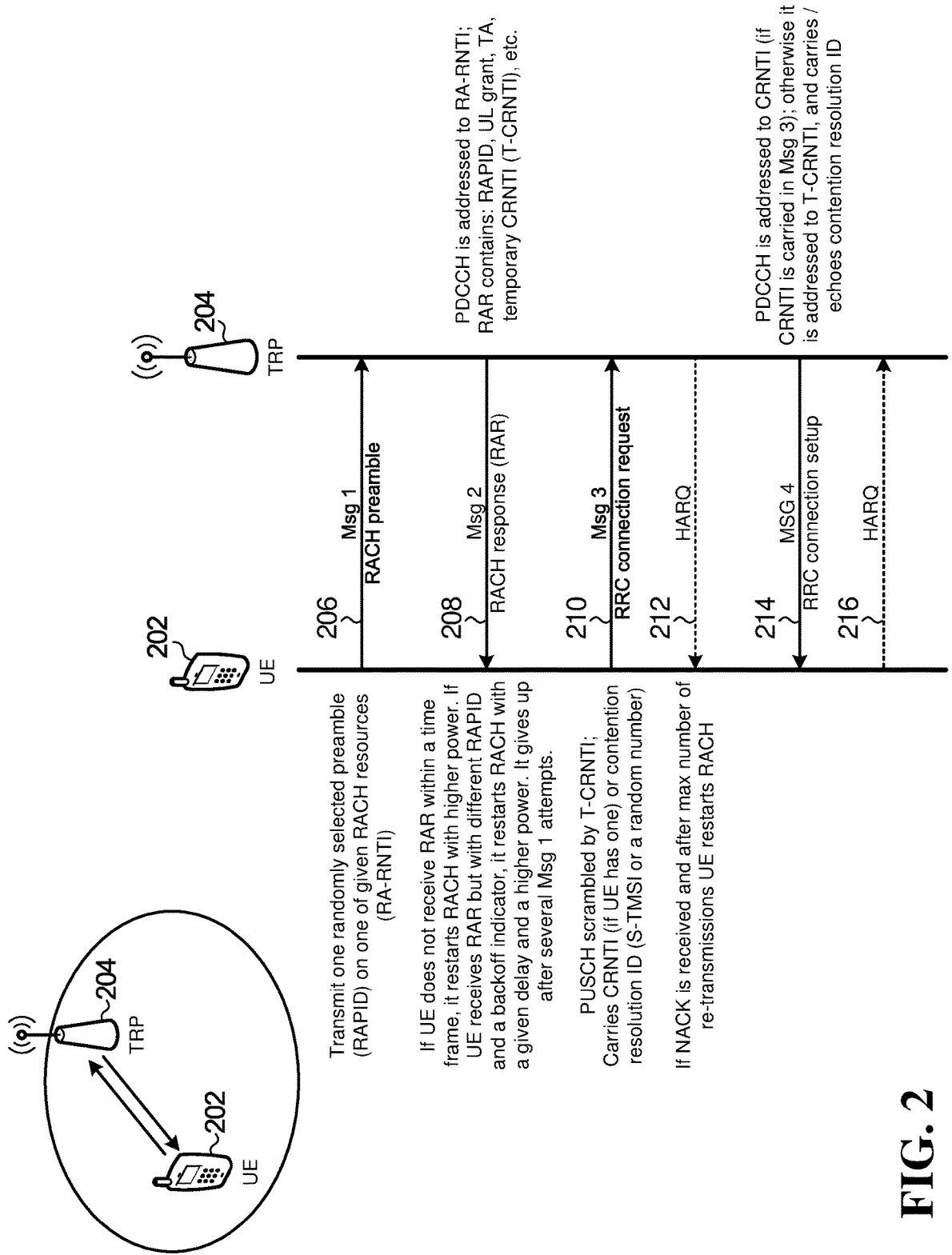
FIG. 2 includes a block diagram and a signal flow diagram illustrating an LTE contention-based RACH procedure.

As noted above, some wireless communication systems employ a connection establishment procedure that involves a message exchange over a RACH. In LTE systems, a UE in RRC idle mode selects a preamble sequence out of a pool of sequences and follows a 4-step procedure to transition to RRC connected mode. FIG. 2 includes a block diagram and a signal flow diagram illustrating an LTE contention-based RACH procedure.

The UE 202 randomly selects a preamble (Random Access Preamble Identifier—RAPID) and one RACH resource. The RACH procedure is initialized by transmitting a Message 1 from the UE 202 to the TRP 204, as shown at 206. Message 1 includes at least the preamble and a Random Access Radio Network Temporary Identifier (RA-RNTI). The TRP 204 transmits a Random Access Response (RAR), also referred to as Message 2, to the UE 202 as shown at 208. The UE 202 monitors the Physical Donwnlink Control Channel (PDCCH) based on the RA-RNTI to determine the downlink (DL) transmission resource in the Physical Downlink Shared Channel (PDSCH) on which the RAR is to be transmitted by the TRP 204.

If the UE 202 does not receive the RAR within a certain time, it restarts the RACH procedure with a higher power for transmitting Message 1. The UE 202 could receive a RAR with a different RAPID and a backoff indicator, in which case it also restarts the RACH procedure with a higher transmit power for Message 1, but after a delay specified by the backoff indicator. The UE 202 may terminate the RACH procedure after a number of Message 1 attempts.

The RACH procedure continues if the UE 202 receives a RAR Message 2 that includes the same RAPID as Message 1, an uplink (UL) grant identifying a Physical Uplink Shared Channel (PUSCH) resource for transmission of an RRC connection request, a Timing Advance (TA), and a Temporary Cell Radio Network Temporary Identifier (T-CRNTI). The UE 202 generates and transmits an RRC connection request, also referred to as Message 3, which is addressed to the T-CRNTI, to the TRP 204 in the granted resource in the PUSCH as shown at 210. Message 3 may include a CRNTI if the UE 202 has a CRNTI, or a contention resolution identifier such as a temporary subscriber identity like SAE-Temporary Mobile Subscriber Identity (S-TMSI), or a random number. This part of the RACH procedure supports Hybrid Automatic Repeat Request (HARQ). Message 3 is retransmitted by the UE 202 in response to a negative acknowledgement (NACK) in HARQ feedback at 212 from the TRP 204, up to a predetermined number of times before restarting the RACH procedure.

In response to a successfully decoded Message 3, the TRP 204 generates and transmits an RRC connection setup message, also referred to as Message 4, to the UE 202 as shown at 214. Message 4 is addressed to the CRNTI from Message 3 if a CRNTI is contained in Message 3. Otherwise, it is addressed to the T-CRNTI from Message 2. Message 4 carries (echoes) the contention resolution ID from Message 3, if a contention resolution ID is contained in Message 3. This part of the RACH procedure also supports HARQ-based retransmission in response to a NACK in HARQ feedback from the UE 202, as shown at 216.

Figure 3:
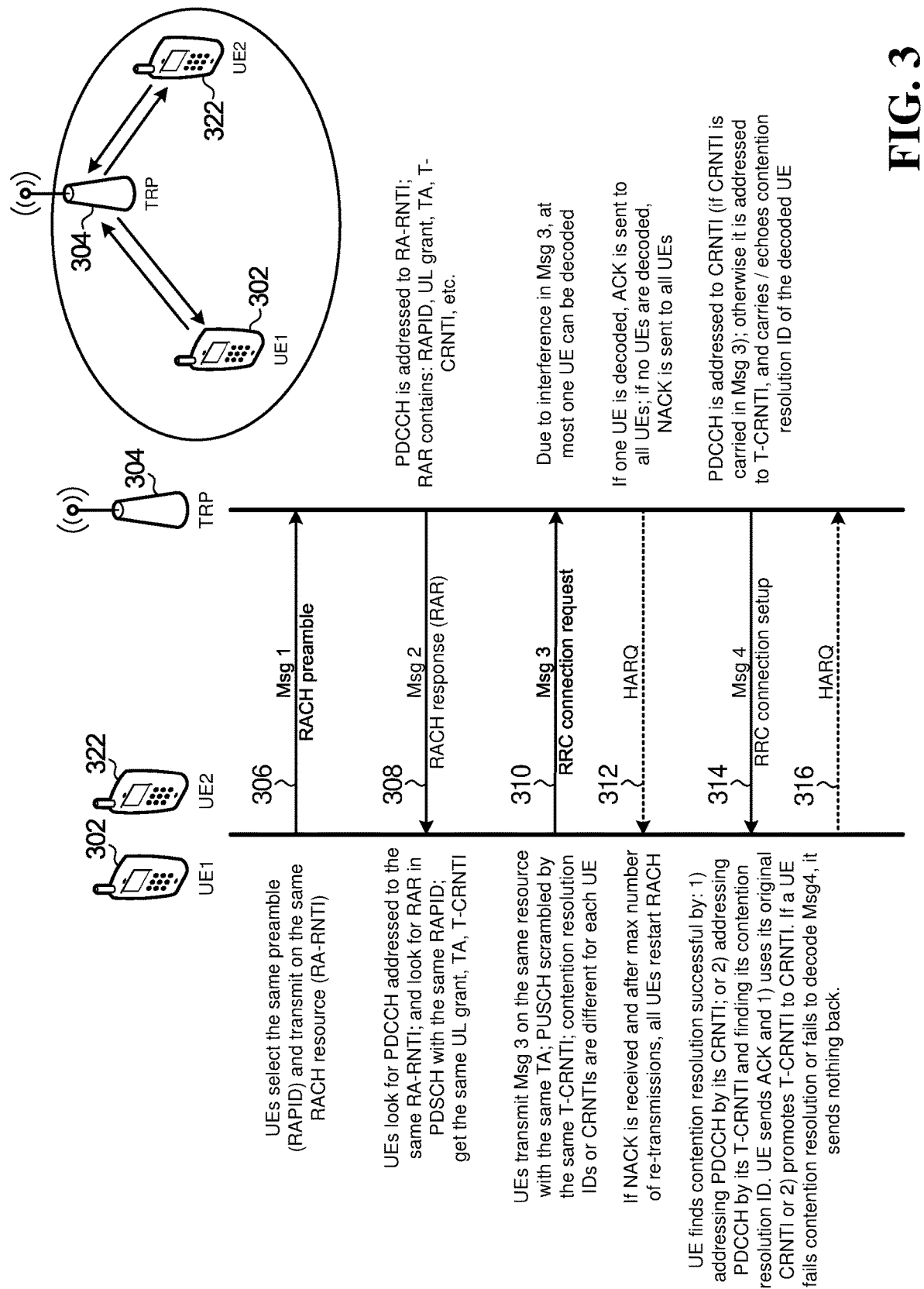
FIG. 3 includes a block diagram and a signal flow diagram illustrating LTE RACH contention resolution.

FIG. 3 includes a block diagram and a signal flow diagram illustrating LTE RACH contention resolution, in a scenario in which multiple UEs, two UEs 302, 322 in the example shown, happen to select the same preamble and transmit on the same RACH resource at 306 to the same TRP 304. The RAR Message 2 is transmitted by the TRP 304, and at 308, all the UEs monitor the PDCCH based on the same RA-RNTI, and then monitor the same DL transmission resource on the PDSCH for the RAR. Presuming that a RAR including the same RAPID as Message 1, a UL grant, a TA, and a T-CRNTI is transmitted by the TRP 304, then all the UEs use the same UL resource and TA for the RRC connection request, Message 3, and address to the same T-CRNTI, at 310. Although the Message 3 from each UE includes a unique contention resolution identifier or a unique CRNTI, due to interference between the Message 3 transmitted by each UE, at most one message might be correctly decoded by the TRP 304. The TRP 304 sends an acknowledgement (ACK) at 312, which is received by all UEs if a Message 3 is decoded, or sends a NACK at 312, which is received by all UEs if no Message 3 is decoded.

At 314, if a Message 3 is successfully decoded by the TRP 304, then the TRP transmits a Message 4 at 314, which is addressed to the CRNTI if a CRNTI is contained in Message 3. Otherwise the Message 4 is addressed to the T-CRNTI from Message 2. The Message 4 includes the contention resolution identifier of the one of the UEs for which a Message 3 was successfully decoded, if a contention resolution identifier is contained in the corresponding Message 3. A UE finds contention resolution successful by 1) addressing PDCCH by CRNTI (if it already has one) and successful decoding it; or 2) addressing PDCCH by T-CRNTI and successfully decoding it and then detecting its contention resolution identifier in the Message 4. The successful UE sends an ACK to the TRP 304 at 316, and either 1) uses its original CRNTI and discards any T-CRNTI or 2) promotes T-CRNTI to CRNTI. Each other failed UE, which either fails to decode Message 4 or detects a contention resolution identifier other than its own contention resolution identifier, restarts the RACH procedure. After receiving an ACK from each UE for a respective Message 4, network equipment such as the TRP 304 can associate each UE 1) with a CRNTI that is sent in Message 3, or 2) with T-CRNTI if no new CRNTI is assigned in Message 4.

In some wireless communication systems, such as proposed 5G New Radio (NR) systems for example, a "cell" or coverage area has a multiple access point topology. There are typically many more UEs than access points or coverage areas in an implementation that is also referred to as a "dense urban" scenario, for example. As the number of UEs increases, the number of UEs simultaneously attempting to access a communication system tends to grow proportionally, and the collision rate of preambles in random access procedures also increases.

Figure 4:
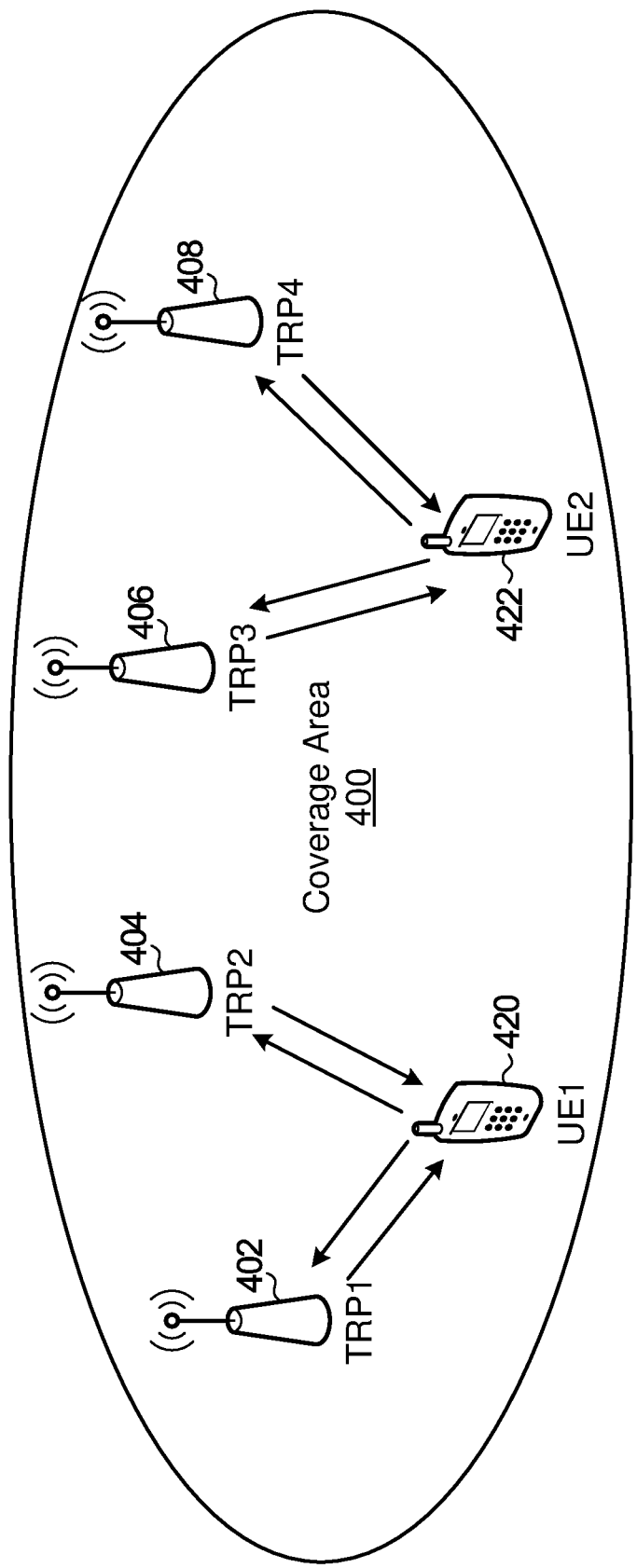
FIG. 4 is a block diagram illustrating a communication system that includes multiple Transmit-Receive Points (TRPs) serving multiple UEs.

FIG. 4 is a block diagram illustrating a communication system that includes multiple TRPs 402, 404, 406, 408 serving multiple UEs 420, 422 in a coverage area 400. The coverage area 400 provides an example of a multi-TRP topology, which could be implemented in any of the wireless coverage areas 110a, 110b, 110c, 110d, 110e in FIG. 1, for example. Actual implementations could include many more than four TRPs and/or many more than two UEs.

One possible option to reduce the likelihood of random access collisions between UEs 420, 422 includes increasing the number of RACH resources and the size of a preamble sequence pool from which each UE selects a RACH resource and preamble to initiate an access procedure. However, this approach might not scale well as the number of UEs grows.

Alternatively, any one or more of several factors could be exploited to resolve collision and contention as disclosed herein, which include, for example 1) the enlarged coverage area size in NR systems, relative to LTE systems with the same TRP density per cell, 2) highly directional beamformed uplink transmission from UEs to high frequency TRPs in some NR systems, 3) multiple UL grants in Message 3 re-transmission in the case of collision (see, for example, R1-1715387, "Remaining Issues in RACH Procedure", Huawei & HiSilicon, 3GPP TSG RAN WG1 Meeting NR #3, Nagoya, Japan, 18-21 Sep. 2017), and/or 4) other interference cancellation schemes in Message 3 transmission. If such contention resolution is successful, multiple colliding UEs could obtain different identifiers, such as different CRNTIs. As a default, if contention resolution as disclosed herein is not successful, then a UE could fall back to LTE-like contention resolution and at most one collided UE obtains a CRNTI after each iteration of a RACH procedure and other failed UEs restart the RACH procedure.

Figure 5:
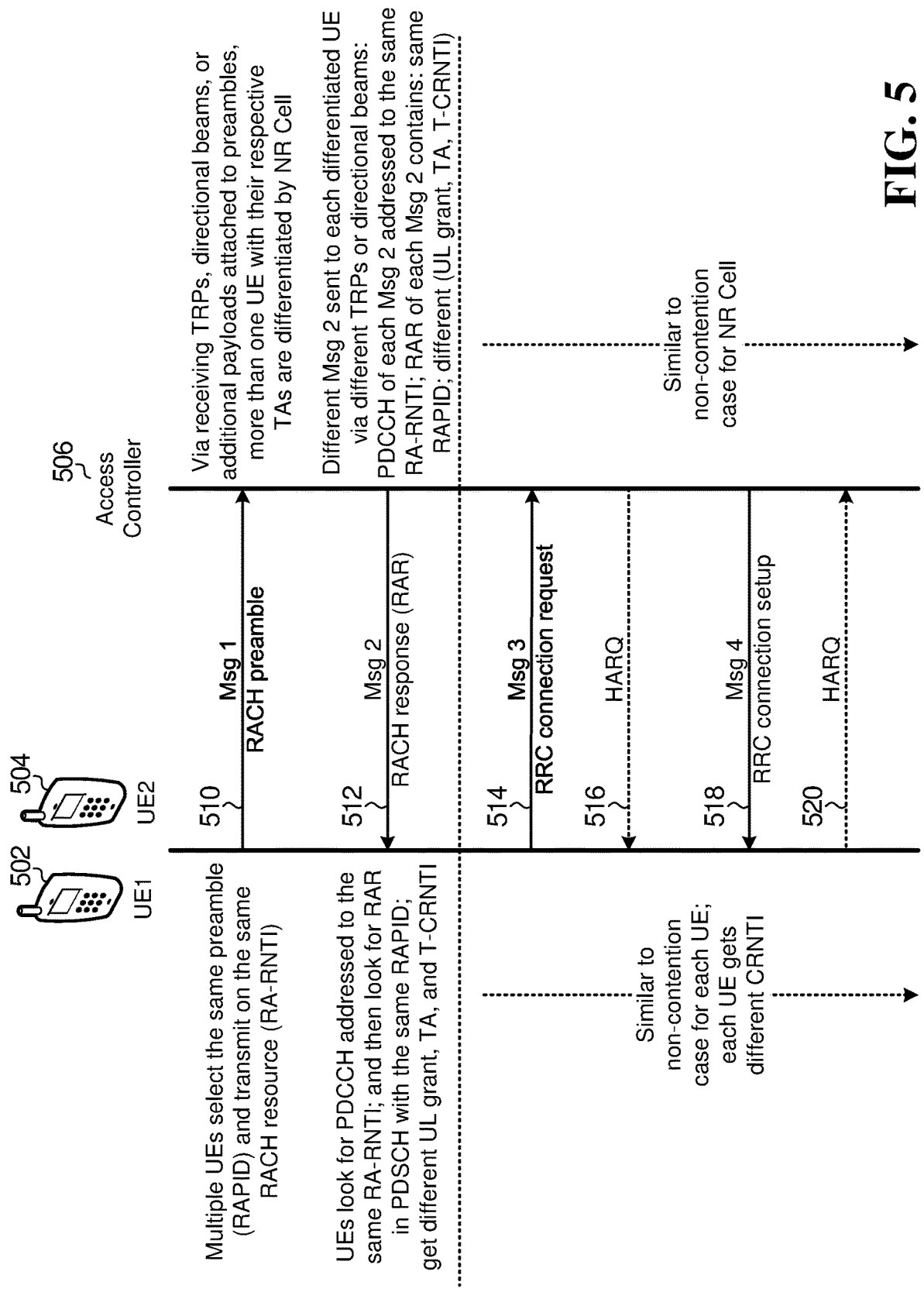
FIG. 5 is a signal flow diagram illustrating contention resolution according to an embodiment.

FIG. 5 is a signal flow diagram illustrating contention resolution according to an embodiment. Although FIG. 5 uses LTE terminology for various access messages, it should be appreciated that these messages need not necessarily be the same as the messages that are used in LTE systems. Embodiments disclosed with reference to FIG. 5, or otherwise disclosed herein, are not in any way restricted to LTE systems or LTE signaling.

In FIG. 5, multiple UEs, two of which are shown at 502, 504 by way of example, select the same preamble and the same RACH resource, and send the same Message 1 at 510. FIG. 5 illustrates an access controller 506 instead of a TRP. As shown in FIG. 4, for example, different UEs could be communicating with different TRPs. The access controller 506 in FIG. 5 could be implemented at an access point such as a TRP, or in a higher-level controller in a coverage area or a network. A higher-level controller, such as the centralized processing system 120 in FIG. 1 for example, communicates with multiple access points. Although messages are shown in FIG. 5 as being transferred between the access controller 506 and the UEs, it should be noted that these messages would be transferred between the UEs and access points, which are not separately shown in FIG. 5 in order to avoid congestion in the drawing.

In FIG. 5, colliding random access channel messages, Message 1 in this example, are received from multiple UEs. These messages include common access information, the same RAPID in this example, for those UEs. These messages are colliding messages in this example because they include the same RAPID and are transmitted in the same resource. However, these received random access channel messages can be differentiated by an NR cell, by the access controller 506 in the example shown, in accordance with the present disclosure.

For example, the access controller 506 could determine at which access points, for example at which sets of one or more geographically separated TRPs, the random access channel messages were received. If the receiving sets of TRPs are not identical and include at least one TRP that is not common to all of the receiving TRP sets, then the access controller 506 could distinguish between the received messages on that basis, and thereby determine that the multiple random access messages were received from different UEs.

In another embodiment, the access controller 506 could determine different directions from which the received messages were received. For example, the access controller 506 could determine on which directional antenna beams, at one or more access points, the random access channel messages were received. This could be applied in systems that use directional antenna beams for at least uplink transmission, such as NR systems that use highly directional beamformed uplink transmission from UEs to high frequency TRPs. If the receiving antenna beams are not identical, then the access controller 506 is able to distinguish between the received messages, even if the messages are received at the same access point. An access controller at an access point could distinguish between the received messages based on different receiving antenna beams. Regardless of whether the access controller 506 is implemented at an access point or elsewhere in a communication system, receiving antenna beam-based differentiation enables the access controller to determine that the multiple random access messages were received from different UEs.

Differentiation between random access channel messages sent by the multiple UEs could be based on different payloads attached to the preambles by the UEs. For example, each of the UEs could attach a random number or S-TMSI to its Message 1, and the access controller 506 may distinguish between the received messages on that basis and determine that the messages were received from different UEs.

The different sets of one or more access points, different directions, different receiving antenna beams, and different payloads are all examples of different characteristics of the received random access channel messages, other than common access information in those messages, based upon which the access controller 506 may distinguish between the received messages.

For contention resolution based on distinguishing between each Message 1 received from the different UEs, a different RAR Message 2 is sent to each UE at 512. Each Message 2 could assign a different UL grant, a different TA, and a different T-CRNTI to each of the UEs, for example. In an embodiment, the network (e.g., the access controller 506) provides different PDCCH messages in Message 2 to each colliding UE such that each UE successfully decodes the intended message for that UE, and not for other UEs. Even though the UEs monitor for a PDCCH CRC scrambled by or otherwise addressed to the same RA-RNTI in this example, the different RARs can be differentiated by the UEs. For example, if Message 1 contention resolution is based on different payloads attached to the random preamble by each UE, then the RAR could be sent to each UE with the same payload that was attached to the preamble in the Message 1 that was sent by that UE. In another embodiment, the different RARs are sent to the UEs using the receiving TRP sets, directions, or antenna beams based upon which the different access messages were received. Responses to the received messages are thus based on the different characteristics that were used to distinguish the received messages from each other.

The remainder of the access procedure at 514, 516, 518, 520 in FIG. 5 could be similar to that of FIG. 2, for each of the UEs 502, 504 to independently obtain a different CRNTI.

Figure 6:
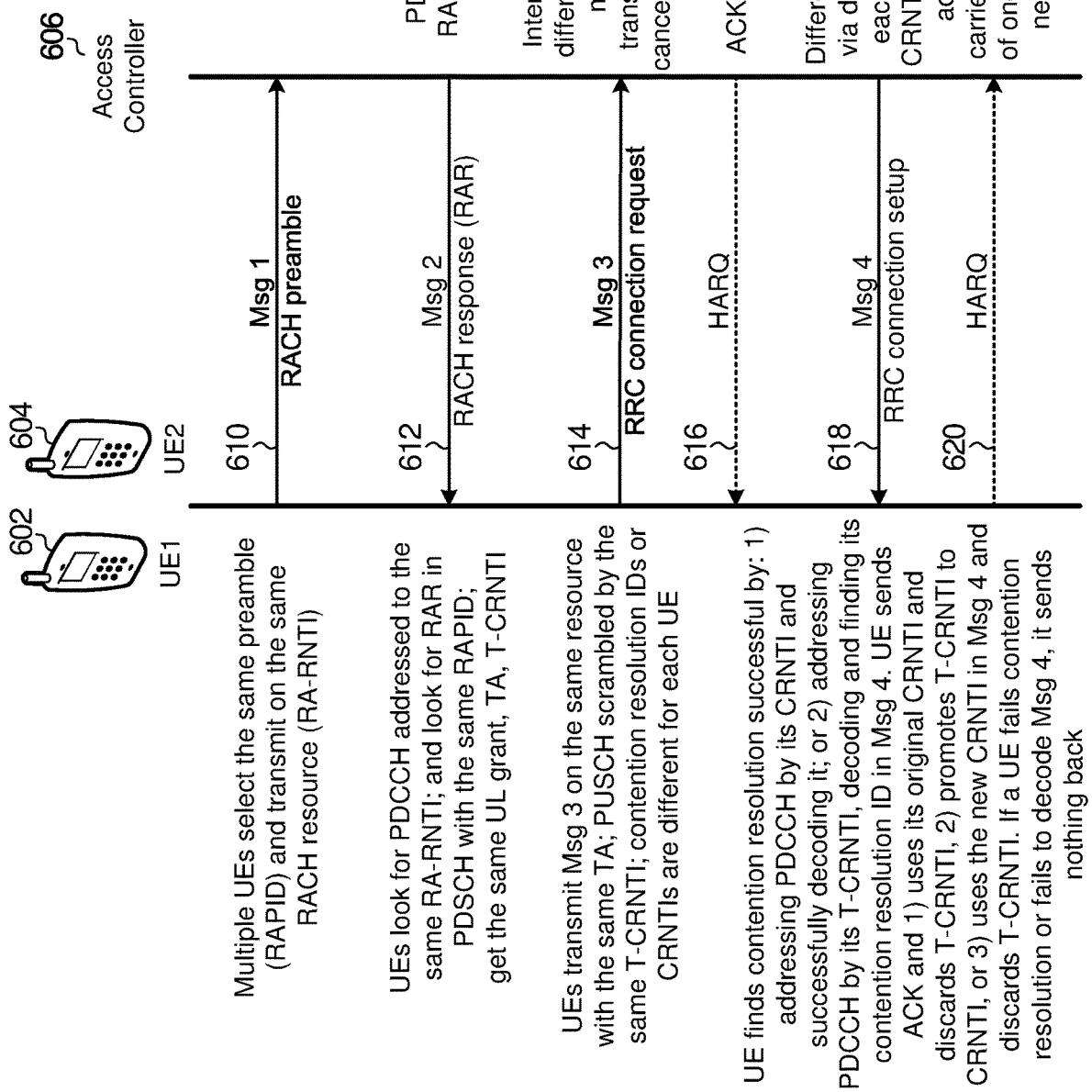
FIG. 6 is a signal flow diagram illustrating contention resolution according to another embodiment.

Colliding access message differentiation in FIG. 5 relates to an initial access message that initiates the access procedure, illustratively a message that could be similar to Message 1 in LTE systems. FIG. 6 is a signal flow diagram illustrating contention resolution according to another embodiment. FIG. 6 relates to contention resolution at a later stage of an access procedure, for connection request messages or other messages that could be similar to Message 3 in LTE systems, for example.

In the example shown in FIG. 6, multiple UEs, two of which are shown by way of example at 602, 604, select and transmit the same preamble on the same RACH resource at 610, and the colliding messages are not differentiated by the access controller 606. All the UEs are assigned the same UL grant, TA, and T-CRNTI in Message 2 at 612. Although all UEs transmit Message 3 on the same resource at 614, and may retransmit Message 3 responsive to HARQ feedback at 616, interference between the messages could be reduced relative to the example shown in FIG. 3, due to different sets of receiving TRPs, different receiving directions, different receiving antenna beams, multiple UL grants used in Message 3 re-transmission, and/or other interference cancellation schemes in Message 3 transmission. Also, the Modulation and Coding order (MCS) of Message 3 is usually low, and in a dense urban scenario, TAs for different UEs may be similar. Therefore, in FIG. 6, even though the TA might be intended for use by only one of the UEs, or might be computed based on a mixture of preambles from multiple UEs, it may be possible for the Message 3 from more than one UEs to be decoded successfully based on the same TA.

Two (or in general, multiple) response messages, RRC connection setup messages or Message 4 in the example shown, are sent to the decoded UEs at 618 via different TRPs or antenna beams for example, and may be retransmitted in response to HARQ feedback at 620. These response messages carry different identifiers for the UEs. For each Message 4, PDCCH is addressed to a CRNTI if the CRNTI was contained in the corresponding Message 3, or PDCCH is addressed to T-CRNTI and PDSCH carries the contention resolution ID from Message 3. For the Message 4's that are addressed to T-CRNTI, some of them (the number equals the number of Message 4's that are addressed to the T-CRNTI minus one) can each carry a new UE identifier besides a contention resolution ID, a new CRNTI in this example, for the corresponding UEs. These new CRNTIs are different from the T-CRNTI assigned in Message 2, and are different from each other, This new CRNTI field in Message 4 is optional, as in this case one decoded colliding UE without an existing CRNTI is not assigned a new CRNTI. In an embodiment, the network (e.g., the access controller 606) provides different PDCCH messages in Message 4 to each colliding UE such that each UE successfully decodes the intended message. For example, among all the decoded colliding UEs in Message 3, if M UEs have a CRNTI (CONNECTED/INACTIVE UEs), and N UEs do not have a CRNTI (IDLE UEs), then N−1 Message 4 corresponding to N−1 decoded colliding UEs without an existing CRNTI can each carry a new CRNTI.

A UE finds contention resolution successful if 1) it addressed Message 4 by its CRNTI (if it has one and sent it in Message 3, and successfully decodes it), or 2) it addresses Message 4 by T-CRNTI and successfully decodes it and then finds its contention resolution ID in decoded Message 4. In the first case, the UE starts to use its original CRNTI and discards the T-CRNTI; in the latter case, the UE promotes its T-CRNTI to CRNTI if no new CRNTI is assigned in Message 4, or the UE uses the assigned new CRNTI if it is carried in Message 4 and discards its T-CRNTI. After receiving ACKs from UEs for respective Message 4's, network equipment, shown in FIG. 6 by way of example as the access controller 606, can associate each UE 1) with its CRNTI that is sent in Message 3, or 2) with its T-CRNTI if no new CRNTI is assigned in Message 4, or 3) with the assigned new CRNTI in Message 4.

Random access channel collision could occur between UEs that are in the same coverage area or in different coverage areas. RACH preambles among cells in LTE systems, for example, are differentiated by the use of preamble sequences that are based on different sets of Zadoff-Chu (ZC) roots. In NR, two types of preambles may be used, including randomly selected preambles for idle/inactive/connected UEs, and UE-dedicated preambles for inactive/connected UEs. Use cases of UE-dedicated preambles are similar to those of randomly selected preambles, such as handover, (DL/UL) data arrival without UL timing, positioning, link recovery, and state transition. For the purpose of state transition, a randomly selected preamble could be used for transition from idle state to connected active state and/or from connected inactive state to connected active state; while a UE-dedicated preamble is used for transition from connected inactive state to connected active state, for example.

For randomly selected preambles, similar to LTE systems, different sets of ZC roots could be used among NR coverage areas in order to avoid inter-coverage area collision.

Using UE-dedicated preambles, which are new in NR systems relative to LTE systems, intra-coverage area collision can also be avoided because preambles are uniquely dedicated to UEs. However, the number of connected (active/inactive) UEs can be large, which in turn would involve assigning a large number of UE-dedicated preambles per coverage area. With a limited preamble pool size, UE-dedicated preambles could be reused among coverage areas.

When reusing UE-dedicated preambles among coverage areas, UE-dedicated preambles in neighboring coverage areas could collide, and this could lead to false alarms in RACH detection. For example, an NR access controller could send a RAR in response to a detected dedicated preamble that is actually sent by a UE in a neighboring coverage area. Such a RAR in this example is not received by the UE that transmitted the preamble, because different coverage area IDs are used to scramble PDCCH CRCs in RAR messages in different coverage areas. A UE that is not being served within one coverage area therefore would not receive a RAR that is generated for a UE that is being served within that coverage area. However, such false alarms may increase transmission overhead in a communication system.

Figure 7:
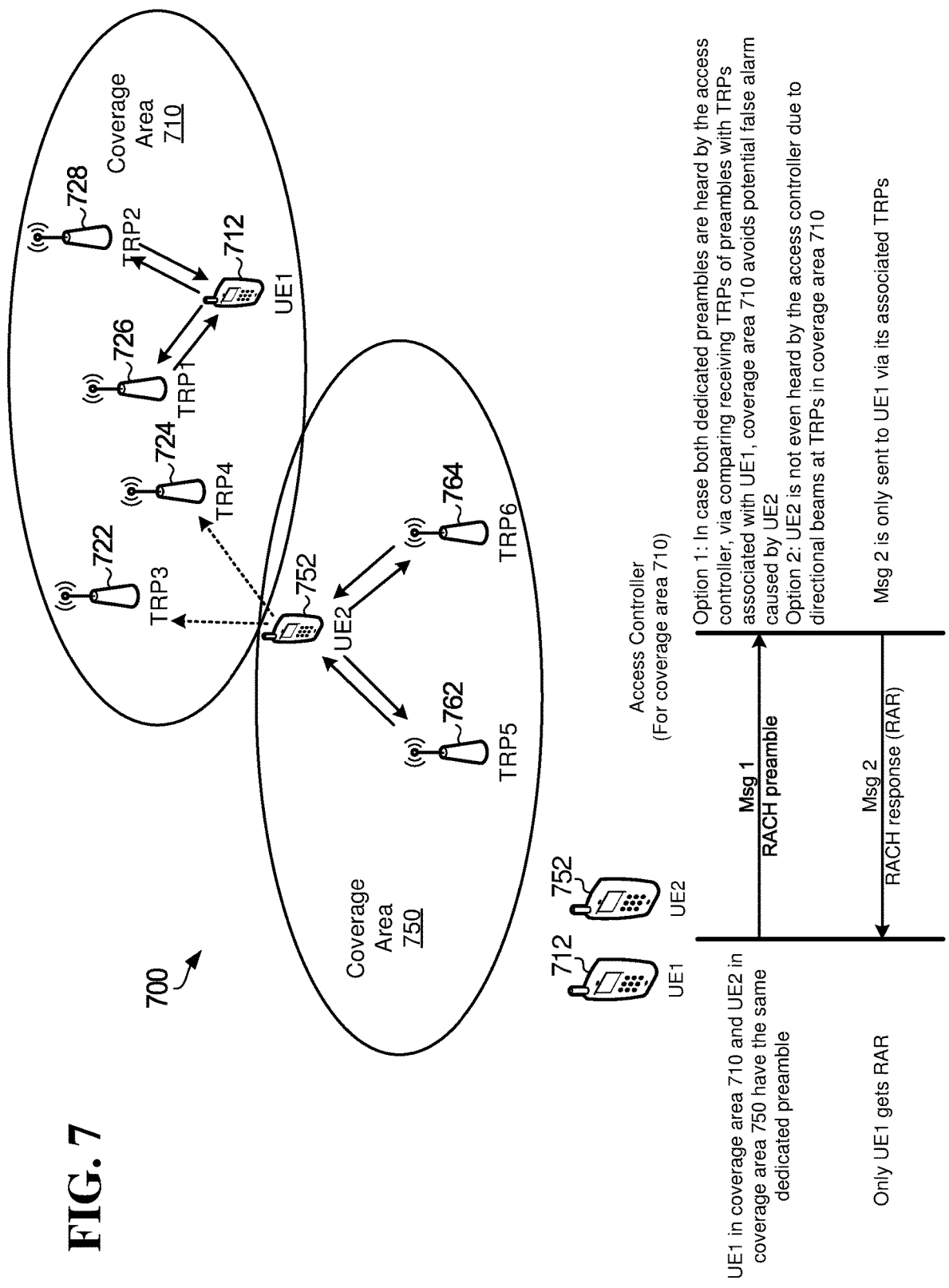
FIG. 7 includes a block diagram and a signal flow diagram illustrating a further embodiment of contention resolution.

FIG. 7 includes a block diagram and a signal flow diagram illustrating a further embodiment of contention resolution. The communication system 700 in FIG. 7 includes two coverage areas 710, 750, each of which includes multiple access points in the form of TRPs 722/724/726/728, 762/764. A UE 712, 752 is shown within each coverage area 710, 750.

In some systems, UEs 712, 752 in neighboring coverage areas 710, 750 could send dedicated preambles. These preambles could be reused in each coverage area 710, 750. In NR systems in which high-frequency TRPs are implemented, for example, preambles might not be received from outside each coverage area due to highly directional receiving antenna beams and beam direction tracking used by such TRPs for UEs that are in a connected state. However, it is possible that dedicated preambles could be received in one coverage area 710 from a UE 752 that is not being served within that coverage area.

From the point of view of any coverage area, the receiving TRPs (or directional beams) of a UE could be used as a form of signature or a characteristic to differentiate access messages. For example, such a signature or characteristic could be useful in differentiating an access message that is properly received from a UE within a coverage area and an access message that is received from another UE in a different coverage area, even if the UEs use the same dedicated preamble. In an embodiment, a UL measurement channel such as an uplink sounding reference signal (SRS) for UEs in active state or inactive state, is used to dynamically update UE-TRP antenna beam associations within coverage areas. An access controller for the coverage area 710, for example, upon receiving the dedicated preamble of the UE 712 in colliding random access channel messages from both UEs 712, 752, could differentiate these messages based on the above-noted characteristics of different receiving TRP sets, different receiving directions, and/or different antenna beams. An access controller could distinguish between access messages that are received from UEs that are within a coverage area and outside the coverage area by comparing the receiving TRPs/directional beams with a set of TRPs/directional beams that is currently serving the UE to which a received dedicated preamble has been dedicated in that coverage area. This is shown in the signal flow diagram in FIG. 7. An access controller for the coverage area 750 could operate in a similar manner, to send a RAR only to the UE 752 in that coverage area in the event that an access message include the preamble that has been dedicated to that UE from another UE that is not being served by the coverage area 750.

This type of differentiation could also or instead be applied in a non-contention scenario, to determine whether a received random channel access message that includes UE-dedicated access information such as a UE-dedicated preamble, was actually received from the UE to which that access information is dedicated within a particular coverage area.

Figure 8:
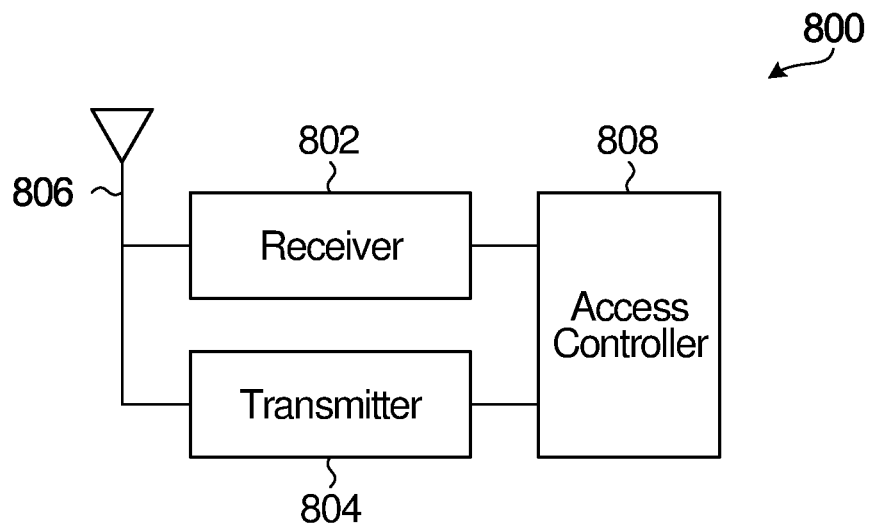
FIG. 8 is a block diagram illustrating an example of network equipment according to another embodiment.

FIG. 8 is a block diagram illustrating an example of network equipment according to a further embodiment. The example network equipment 800 includes a receiver 802 and a transmitter 804 coupled to one or more antennas at 806, and an access controller 808 coupled to the transmitter and the receiver.

Hardware, firmware, components that execute software, or some combination thereof might be used in implementing at least the receiver 802, the transmitter 804, and the access controller 808. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

In some embodiments, the receiver 802 includes a demodulator, an amplifier, and/or other components of an RF receive chain, and the transmitter 804 includes a modulator, an amplifier, and/or other components of an RF transmit chain. The receiver 802 and the transmitter 804 are operative to receive communication signals from and transmit communication signals to UEs and/or network equipment in a communication system. The particular structure and operation of the receiver 802 and the transmitter 804 are implementation-dependent.

At least the access controller 808 is implemented in circuitry, such as a processor. Such circuitry to implement the access controller 808 is configured to handle access messages as disclosed herein. In a processor-based implementation, processor-executable instructions to configure a processor to perform operations are stored in a non-transitory processor-readable medium. The non-transitory medium could include one or more solid-state memory devices and/or memory devices with movable and possibly removable storage media.

Software that may be used in operation of the network equipment 800 could be stored in one or more physical memory devices. Memory devices could instead be internal to one or more of the components shown in FIG. 8. External memory devices operatively coupled to the illustrated components, or to one or more processors that implement those components, are also possible.

The antenna 806 could include separate receive and transmit antennas or sets of antennas, or the same antenna or set of antennas could be used for both transmitting and receiving. The antenna 806 enables wireless communications, between the network equipment 800 and UEs for example. The antenna 806 could include one or more antennas of any of various types. The type of the antenna, or each antenna, provided at 806 could be implementation-dependent.

Network equipment may include other components, such as one or more interfaces to other network equipment, for example. As noted above, an access controller could be implemented at access points, and such access points could include the components as shown in FIG. 8. In another embodiment, an access controller communicates with multiple access points, and could be implemented elsewhere in a communication system. Network equipment in such an implementation could communicate with access points through wired connections, in addition to or instead of through the antenna 806.

The access controller 808 is operative to receive, through the receiver 802, colliding random access channel messages from multiple UEs that are attempting to access a communication system. The received random access channel messages include common access information for the multiple UEs. The access controller 808 is also operative to distinguish between the received random access channel messages based on different characteristics of the received random access channel messages other than the common access information.

In another embodiment, the access controller 808 is operative to receive, through the receiver 802, a random access channel message from a UE. The received random access channel message includes a dedicated random access sequence dedicated for use by a particular UE within a coverage area of a communication system. The access controller 808 is also operative to determine whether the received random access channel is received from the particular UE based on any one or more of: a set of one or more access points at which the received random access channel message is received, a direction from which the received random access channel message is received, and a receiving antenna beam on which the received random access channel message is received.

The receiver 802, the access controller 808, and/or the transmitter 804 could be configured to implement or support other features as disclosed herein. Examples of additional operations that may be performed by the receiver 802, the transmitter 804, or the access controller 808, as well as various ways to perform such operations, are described herein.

Figure 9:
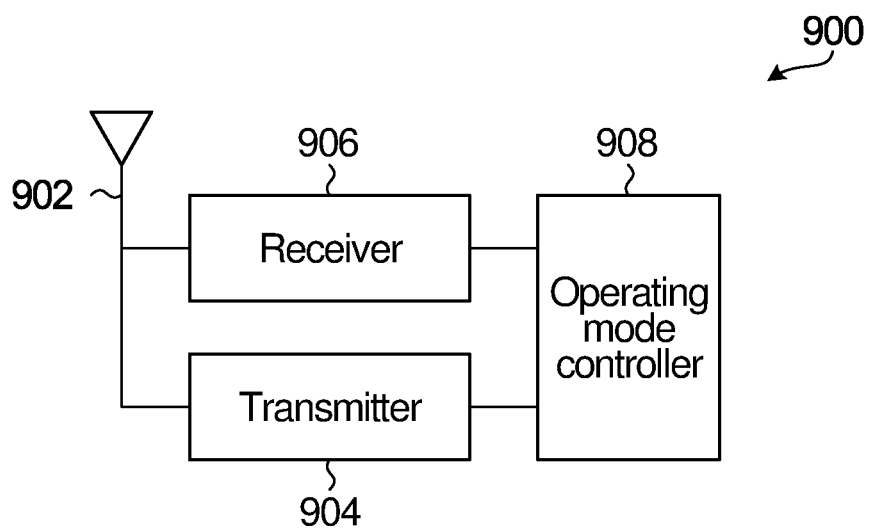
FIG. 9 is a block diagram illustrating a UE according to an embodiment.

FIG. 9 is a block diagram illustrating an example UE according to an embodiment. The example UE 900 includes an antenna 902, a transmitter 904 and a receiver 906 coupled to the antenna, and an operating mode controller 908 coupled to the transmitter and to the receiver.

Although a single antenna 902 is shown in FIG. 9, a UE could include multiple antennas. Separate receive and transmit antennas or sets of multiple antennas could be provided at 902, or the same antenna or set of multiple antennas could be used for both receiving and transmitting communication signals. The antenna 902 could include one or more antennas of any of various types. The type of the antenna, or each antenna, provided at 902 could be implementation-dependent.

In general, hardware, firmware, components which execute software, or some combination thereof might be used in implementing the transmitter 904, the receiver 906, and the operating mode controller 908. Examples of electronic devices that might be suitable for implementing any or all of these components are provided above.

In some embodiments, the receiver 906 includes a demodulator, an amplifier, and/or other components of an RF receive chain, and the transmitter 904 includes a modulator, an amplifier, and/or other components of an RF transmit chain. The transmitter 904 and the receiver 906 are operative to transmit communication signals to and receive communication signals from network equipment in a communication system. The particular structure and operation of the transmitter 904 and the receiver 906 are implementation-dependent.

At least the operating mode controller 908 is implemented in circuitry, such as a processor. Such circuitry to implement the operating mode controller 908 is configured to handle UE-side processing of access messages as disclosed herein, and to transition the UE 900 between different operating states. In a processor-based implementation, processor-executable instructions to configure a processor to perform operations are stored in a non-transitory processor-readable medium. The non-transitory medium could include one or more solid-state memory devices and/or memory devices with movable and possibly removable storage media.

Software that may be used in operation of the UE 900 could be stored in one or more physical memory devices. Memory devices could instead be internal to one or more of the components shown in FIG. 9. External memory devices operatively coupled to the illustrated components, or to one or more processors that implement those components, are also possible.

The antenna 902 could include separate receive and transmit antennas or sets of antennas, or the same antenna or set of antennas could be used for both transmitting and receiving. The antenna 902 enables wireless communications, between the UE 900 and network equipment for example.

A UE could include other components, in addition to or instead of those shown in FIG. 9.

Figure 10:
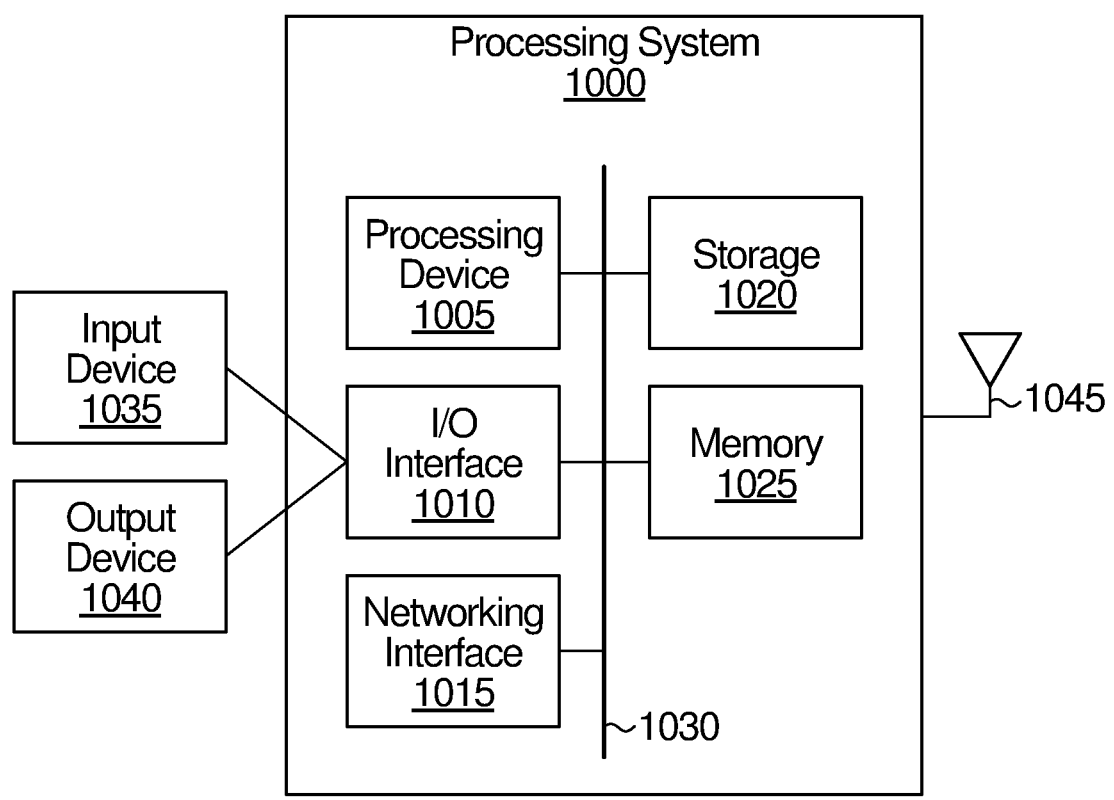
FIG. 10 is a block diagram of an example simplified processing system, which may be used to implement embodiments disclosed herein.

FIGS. 8 and 9 are generalized block diagrams of apparatus that could be used to implement embodiments disclosed herein. FIG. 10 is a block diagram of an example simplified processing system 1000, which may be used to implement embodiments, and provides a higher level implementation example. The apparatus 800, the apparatus 900, or both, may be implemented using the example processing system 1000, or variations of the processing system 1000. The processing system 1000 could be a server or a mobile device, for example, or any suitable processing system. Other processing systems suitable for implementing embodiments described in the present disclosure may be used, which may include components different from those discussed below. Although FIG. 10 shows a single instance of each component, there may be multiple instances of each component in the processing system 1000.

The processing system 1000 may include one or more processing devices 1005, such as a processor, a microprocessor, an application-specific integrated circuit (ASIC), a field-programmable gate array (FPGA), a dedicated logic circuitry, or combinations thereof. The processing system 1000 may also include one or more input/output (I/O) interfaces 1010, which may enable interfacing with one or more appropriate input devices 1035 and/or output devices 1040. The processing system 1000 may include one or more network interfaces 1015 for wired or wireless communication with a network (e.g., an intranet, the Internet, a P2P network, a WAN and/or a LAN) or other node. The network interfaces 1015 may include wired links (e.g., Ethernet cable) and/or wireless links (e.g., one or more antennas) for intra-network and/or inter-network communications. The network interfaces 1015 may provide wireless communication via one or more transmitters or transmit antennas and one or more receivers or receive antennas, for example. In this example, a single antenna 1045 is shown, which may serve as both transmitter and receiver. However, in other examples there may be separate antennas for transmitting and receiving. The processing system 1000 may also include one or more storage units 1020, which may include a mass storage unit such as a solid state drive, a hard disk drive, a magnetic disk drive and/or an optical disk drive.

The processing system 1000 may include one or more memories 1025, which may include a volatile or non-volatile memory (e.g., a flash memory, a random access memory (RAM), and/or a read-only memory (ROM)). The non-transitory memories 1025 may store instructions for execution by the processing devices 1005, such as to carry out examples described in the present disclosure. The memories 1025 may include other software instructions, such as for implementing an operating system and other applications/functions. In some examples, one or more data sets and/or modules may be provided by an external memory (e.g., an external drive in wired or wireless communication with the processing system 1000) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 1030 providing communication among components of the processing system 1000. The bus 1030 may be any suitable bus architecture including, for example, a memory bus, a peripheral bus or a video bus. In FIG. 10, the input devices 1035 (e.g., a keyboard, a mouse, a microphone, a touchscreen, and/or a keypad) and output devices 1040 (e.g., a display, a speaker and/or a printer) are shown as external to the processing system 1000. In other examples, one or more of the input devices 1035 and/or the output devices 1040 may be included as a component of the processing system 1000.

Various embodiments are described by way of example above. The embodiments encompass, for example, a method that involves receiving colliding random access channel messages from multiple UEs that are attempting to access a communication system. In some embodiments, the received random access channel messages include common access information for the multiple UEs.

A method could involve transmitting responses to the received random access channel messages, with the responses including a response to one of the UEs that includes UE identifier information from the common access information and responses to other UEs that include new UE identifier information for each other UE. An example of such a method is shown in FIG. 6, in which the access controller 606 receives multiple Message 3's with the same T-CRNTI from multiple UEs, and transmits Message 4's in response. The T-CRNTI in FIG. 6 is an example of the UE identifier information, and in particular a temporary identifier assigned in response to previous colliding random access channel messages. A new CRNTI in a Message 4 as shown in FIG. 6 is an example of new UE identifier information including an identifier that is different from the temporary identifier.

Some embodiments could involve distinguishing between the received random access channel messages based on different characteristics of the received random access channel messages other than the common access information. An example of such a method is shown in FIG. 5.

The different characteristics could include, for example, different sets of one or more access points at which the received random access channel messages are received.

In another embodiment, different characteristics include different directions from which the received random access channel messages are received. The different directions could be determined, for example, based on receiving antenna beams on which the received random access channel messages are received.

The different characteristics could also or instead include different payloads attached to the common access information in the received random access channel messages.

Regarding the common access information, this could be or include a predetermined sequence selected by each of the UEs, such as the same preamble selected by the UEs as shown in FIG. 5.

The responses could be transmitted based on the different characteristics. In embodiments in which different payloads are attached to the common access information in the received random access channel messages, for example, the response transmitted to each UE could carry the different payload that is attached to the common access information in the random access channel message that is received from the UE.

Common UE identifier information could be or include the same T-CRNTI assigned to multiple UEs in Message 2 (see FIG. 6, for example), and some Message 4's may then carry new UE identifier information, in the form of a new CRNTI different from the T-CRNTI in the example shown in FIG. 6.

This example of a T-CRNTI is illustrative of UE identifier information that is a temporary identifier assigned in response to previous colliding random access channel messages (the colliding Message 1's in FIG. 6), and new UE identifier information that is an identifier different from the temporary identifier. NR RACH contention resolution, for example, could support assignment of an optional C-RNTI field in Message 4, that contains a C-RNTI different from the temporary C-RNTI assigned in Message 2.

The random access channel message received from each UE could also include contention resolution identifier information for the UE, such as a contention resolution ID as shown in FIG. 6. Each of the responses to the received random access channel messages could then include the UE identifier information such as the T-CRNTI in FIG. 6, and the contention resolution identifier information for the UE to which the response is transmitted. As an example, multiple Message 4's with different contention resolution IDs could be transmitted as shown in FIG. 6. Therefore, when more than one colliding UE with different contention resolution IDs are resolved, multiple Message 4's could be sent to the UEs with corresponding contention resolution IDs and at the same temporary CRNTI.

In another embodiment, transmitting responses to the received random access channel messages could involve transmitting responses that include either a temporary identifier (such as T-CRNTI) assigned in response to previous colliding random access channel messages (such as colliding Message 1's) and to be used by a UE in subsequently accessing the random access channel, or a new identifier (such as CRNTI) to be used by a UE in subsequently accessing the random access channel. If a contention resolved UE finds a CRNTI in Message 4, for example, then the UE could adopt that CRNTI that is assigned in Message 4. If the Message 4 does not include a CRNTI, then the UE could promote its temporary CRNTI as its formal CRNTI for subsequently accessing the random access channel. This is shown by way of example as option 2) at the bottom left of FIG. 6.

The features described herein need not necessarily be implemented in combination with each other. For example, a method according to another embodiment could involve receiving, from a UE, a random access channel message that includes a dedicated random access sequence dedicated for use by a particular UE within a coverage area of a communication system; and determining whether the received random access channel is received from the particular UE based on any one or more of: a set of one or more access points at which the received random access channel message is received, a direction from which the received random access channel message is received, and a receiving antenna beam on which the received random access channel message is received. An example of such a method is shown in FIG. 7.

The methods disclosed herein are illustrative example embodiments. Other embodiments are also contemplated. For example, a non-transitory processor-readable medium could store instructions which, when executed by one or more processors, cause the one or more processors to perform a disclosed method.

In another embodiment, an apparatus includes a receiver, a transmitter, and an access controller, as shown in FIG. 8 for example. Receiver, transmitter, and/or access controller features, and other apparatus features as disclosed herein, could be implemented in other ways, such as in a processor and a non-transitory processor-readable medium storing instructions that, when executed by the processor, configure the processor to perform actions or otherwise provide features of apparatus components. The simplified processing system in FIG. 10, for example, could be used to implement a processor-based embodiment.

An access controller could be operatively coupled to the receiver and to the transmitter, or a processor could be configured, to receive colliding random access channel messages from multiple UEs attempting to access a communication system. The received random access channel messages include common access information for the multiple UEs, as described herein.

Other features disclosed herein could also or instead be implemented in apparatus embodiments. For example, any of the following could be provided, alone or in any of various combinations, in embodiments:

the access controller is configured to transmit responses to the received random access channel messages;

the responses include a response to one of the UEs that includes UE identifier information from the common access information and responses to other UEs that include new UE identifier information for each other UE;

the access controller is configured to distinguish between the received random access channel messages based on different characteristics of the received random access channel messages other than the common access information;

the different characteristics include different sets of one or more access points at which the received random access channel messages are received;

the different characteristics include different directions from which the received random access channel messages are received;

the different directions are determined based on receiving antenna beams on which the received random access channel messages are received;

the different characteristics include different payloads attached to the common access information in the received random access channel messages;

the common access information includes a predetermined sequence selected by each of the UEs;

the access controller, or a processor in a processor-based embodiment, is configured to transmit the responses to the received random access channel messages based on the different characteristics;

the response transmitted to each UE carries the different payload attached to the common access information in the random access channel message received from the UE;

the UE identifier information includes a temporary identifier assigned in response to previous colliding random access channel messages;

the new UE identifier information includes an identifier that is different from the temporary identifier;

the random access channel message received from each UE includes contention resolution identifier information for the UE;

each of the responses to the other UEs includes the UE identifier information and the contention resolution identifier information for the other UE to which the response is transmitted.

The apparatus features disclosed herein need not be implemented in combination with each other. For example, in another embodiment, an apparatus includes a receiver and an access controller. The access controller is operatively coupled to the receiver, or a processor is configured in a processor-based embodiment, to receive from a UE a random access channel message that includes a dedicated random access sequence dedicated for use by a particular UE within a coverage area of a communication system, and to determine whether the received random access channel is received from the particular UE based on one or more of: a set of one or more access points at which the received random access channel message is received, a direction from which the received random access channel message is received, and a receiving antenna beam on which the received random access channel message is received.

What has been described is merely illustrative of the application of principles of embodiments of the present disclosure. Other arrangements and methods can be implemented by those skilled in the art.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in the other drawings are also intended solely for illustrative purposes.

Other implementation details could also vary between different embodiments. For example, some of the examples above refer to LTE and NR terminology. However, the embodiments disclosed herein are not in any way limited to LTE/NR systems.

The examples above primarily refer to collision or contention between 2 UEs. Embodiments disclosed herein could also or instead be applied to collision or contention between more than 2 UEs.

In addition, although described primarily in the context of methods and systems, other implementations are also contemplated, as instructions stored on a non-transitory processor-readable medium, for example. The instructions, when executed by one or more processors, cause the one or more processors to perform a method.

A non-transitory computer readable medium could include instructions for execution by a processor, to implement and/or control operation of network equipment, to control operation user equipment, and/or to otherwise control the execution of methods described herein. In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which could be, for example, a compact disc read-only memory (CD-ROM), universal serial bus (USB) flash disk, or a removable hard disk.

Additional examples are also described below.

According to an example 1, a method comprises: receiving colliding random access channel messages from multiple UEs attempting to access a communication system, the received random access channel messages comprising common access information for the multiple UEs; and distinguishing between the received random access channel messages based on different characteristics of the received random access channel messages other than the common access information.

An example 2 relates to the method of example 1, wherein the different characteristics comprise different sets of one or more access points at which the received random access channel messages are received.

An example 3 relates to the method of example 1, wherein the different characteristics comprise different directions from which the received random access channel messages are received.

An example 4 relates to the method of example 3, wherein the different directions are determined based on receiving antenna beams on which the received random access channel messages are received.

An example 5 relates to the method of example 1, wherein the different characteristics comprise different payloads attached to the common access information in the received random access channel messages.

An example 6 relates to the method of any one of examples 1 to 5, wherein the common access information comprises a predetermined sequence selected by each of the UEs.

An example 7 relates to the method of any one of examples 1 to 6, further comprising: transmitting responses to the received random access channel messages based on the different characteristics.

An example 8 relates to the method of example 5, further comprising: transmitting responses to the received random access channel messages, wherein the response transmitted to each UE carries the different payload attached to the common access information in the random access channel message received from the UE.

An example 9 relates to the method of example 1, wherein the common access information comprises UE identifier information.

An example 10 relates to the method of example 9, further comprising: transmitting responses to the received random access channel messages, the responses comprising a response to one of the UEs that includes the UE identifier information and responses to other UEs that include new UE identifier information for each other UE.

According to an example 11, a method comprises: receiving from a UE a random access channel message that includes a dedicated random access sequence dedicated for use by a particular UE within a coverage area of a communication system; and determining whether the received random access channel is received from the particular UE based on any one or more of: a set of one or more access points at which the received random access channel message is received, a direction from which the received random access channel message is received, and a receiving antenna beam on which the received random access channel message is received.

An example 12 relates to a non-transitory processor-readable medium storing instructions which, when executed by one or more processors, cause the one or more processors to perform the method of any one of examples 1 to 11.

According to an example 13, an apparatus comprises: a receiver; and an access controller, operatively coupled to the receiver, to receive colliding random access channel messages from multiple User Equipment (UEs) attempting to access a communication system, the received random access channel messages comprising common access information for the multiple UEs, and to distinguish between the received random access channel messages based on different characteristics of the received random access channel messages other than the common access information.

An example 14 relates to apparatus of example claim 13, wherein the receiver, the access controller, and/or a transmitter operatively coupled to the access controller is configured to implement or support features as defined in any of examples 2 to 10.

According to an example 15, an apparatus comprises: a receiver; and an access controller, operatively coupled to the receiver, to receive from a UE a random access channel message that includes a dedicated random access sequence dedicated for use by a particular UE within a coverage area of a communication system, and to determine whether the received random access channel is received from the particular UE based on one or more of: a set of one or more access points at which the received random access channel message is received, a direction from which the received random access channel message is received, and a receiving antenna beam on which the received random access channel message is received.

Colliding random access channel messages from multiple UEs that are attempting to access a communication system include common access information for the multiple UEs. These colliding random access channel messages are distinguished from each other based on different characteristics of the received random access channel messages other than the common access information. In another embodiment, a random access channel message that is received from a UE includes a dedicated random access sequence that is dedicated for use by a particular UE within a coverage area of a communication system. A determination can be made as to whether the received random access channel is received from the particular UE based on any one or more of: a set of one or more access points at which, a direction from which, and a receiving antenna beam on which the received random access channel message is received.

We claim:
1. A method comprising:
receiving colliding random access channel messages from multiple User Equipment (UEs) attempting to access a communication system, the received random access channel messages comprising common access information for the multiple UEs; and
transmitting responses to the received random access channel messages, the responses comprising a response to one of the UEs that includes UE identifier information from the common access information and responses to other UEs that assign new UE identifier information to each other UE, wherein the new UE identifier information for each other UE are different from each other and are different from the UE identifier information from the common access information.
2. The method of claim 1, further comprising:
distinguishing between the received random access channel messages based on different characteristics of the received random access channel messages other than the common access information.

3. The method of claim 2, wherein the different characteristics comprise different sets of one or more access points at which the received random access channel messages are received.

4. The method of claim 2, wherein the different characteristics comprise different directions from which the received random access channel messages are received.

5. The method of claim 4, wherein the different directions are determined based on receiving antenna beams on which the received random access channel messages are received.

6. The method of claim 2, wherein the different characteristics comprise different payloads attached to the common access information in the received random access channel messages.

7. The method of claim 6, wherein the response transmitted to each UE carries the different payload attached to the common access information in the random access channel message received from the UE.

8. The method of claim 2, comprising:
transmitting the responses to the received random access channel messages based on the different characteristics.

9. The method of claim 2, wherein the common access information comprises a predetermined sequence selected by each of the UEs.

10. The method of claim 1, wherein the UE identifier information from the common access information comprises a temporary identifier assigned in response to previous colliding random access channel messages, and wherein the new UE identifier information comprises an identifier that is different from the temporary identifier.

11. The method of claim 1, wherein the random access channel message received from each UE further comprises contention resolution identifier information for the UE, each of the responses to the other UEs comprising the UE identifier information from the common access information and the contention resolution identifier information for the other UE to which the response is transmitted.

12. A method comprising:
receiving from User Equipment (UE) a random access channel message that includes a dedicated random access sequence dedicated for use by a particular UE within a coverage area of a communication system; and
determining whether the received random access channel message is received from the particular UE based on a set of two or more access points at which the received random access channel message is received.

13. The method of claim 12, wherein determining whether the received random access channel message is received from the particular UE is further based on any one or more of: a direction from which the received random access channel message is received and a receiving antenna beam on which the received random access channel message is received.

14. An apparatus comprising:
a receiver;
a transmitter; and
an access controller, operatively coupled to the receiver and to the transmitter, to receive colliding random access channel messages from multiple User Equipment (UEs) attempting to access a communication system, the received random access channel messages comprising common access information for the multiple UEs, and to transmit responses to the received random access channel messages, the responses comprising a response to one of the UEs that includes UE identifier information from the common access information and responses to other UEs that assign new UE identifier information to each other UE, wherein the new UE identifier information for each other UE are different from each other and are different from the UE identifier information from the common access information.

15. The apparatus of claim 14, wherein the access controller is further configured to distinguish between the received random access channel messages based on different characteristics of the received random access channel messages other than the common access information.

16. The apparatus of claim 15, wherein the different characteristics comprise different sets of one or more access points at which the received random access channel messages are received.

17. The apparatus of claim 15, wherein the different characteristics comprise different directions from which the received random access channel messages are received.

18. The apparatus of claim 17, wherein the different directions are determined based on receiving antenna beams on which the received random access channel messages are received.

19. The apparatus of claim 15, wherein the different characteristics comprise different payloads attached to the common access information in the received random access channel messages.

20. The apparatus of claim 19, the response transmitted to each UE carries the different payload attached to the common access information in the random access channel message received from the UE.

21. The apparatus of claim 15, wherein the access controller is configured to transmit the responses to the received random access channel messages based on the different characteristics.

22. The apparatus of claim 15, wherein the common access information comprises a predetermined sequence selected by each of the UEs.

23. The apparatus of claim 14, wherein the UE identifier information from the common access information comprises a temporary identifier assigned in response to previous colliding random access channel messages, and wherein the new UE identifier information comprises an identifier that is different from the temporary identifier.

24. The apparatus of claim 14, wherein the random access channel message received from each UE further comprises contention resolution identifier information for the UE, each of the responses to the other UEs comprising the UE identifier information from the common access information and the contention resolution identifier information for the other UE to which the response is transmitted.

25. An apparatus comprising:
a receiver; and
an access controller, operatively coupled to the receiver, to receive from User Equipment (UE) a random access channel message that includes a dedicated random access sequence dedicated for use by a particular UE within a coverage area of a communication system, and to determine whether the received random access channel message is received from the particular UE based on a set of two or more access points at which the received random access channel message is received.

26. The apparatus of claim 25, wherein the access controller is further to determine whether the received random access channel message is received from the particular UE based on any one or more of: a direction from which the received random access channel message is received and a receiving antenna beam on which the received random access channel message is received.

\* \* \* \* \*